June 16, 1942. A. P. BALL 2,286,946
ADJUSTABLE SEAT
Filed July 13, 1938 2 Sheets-Sheet 1
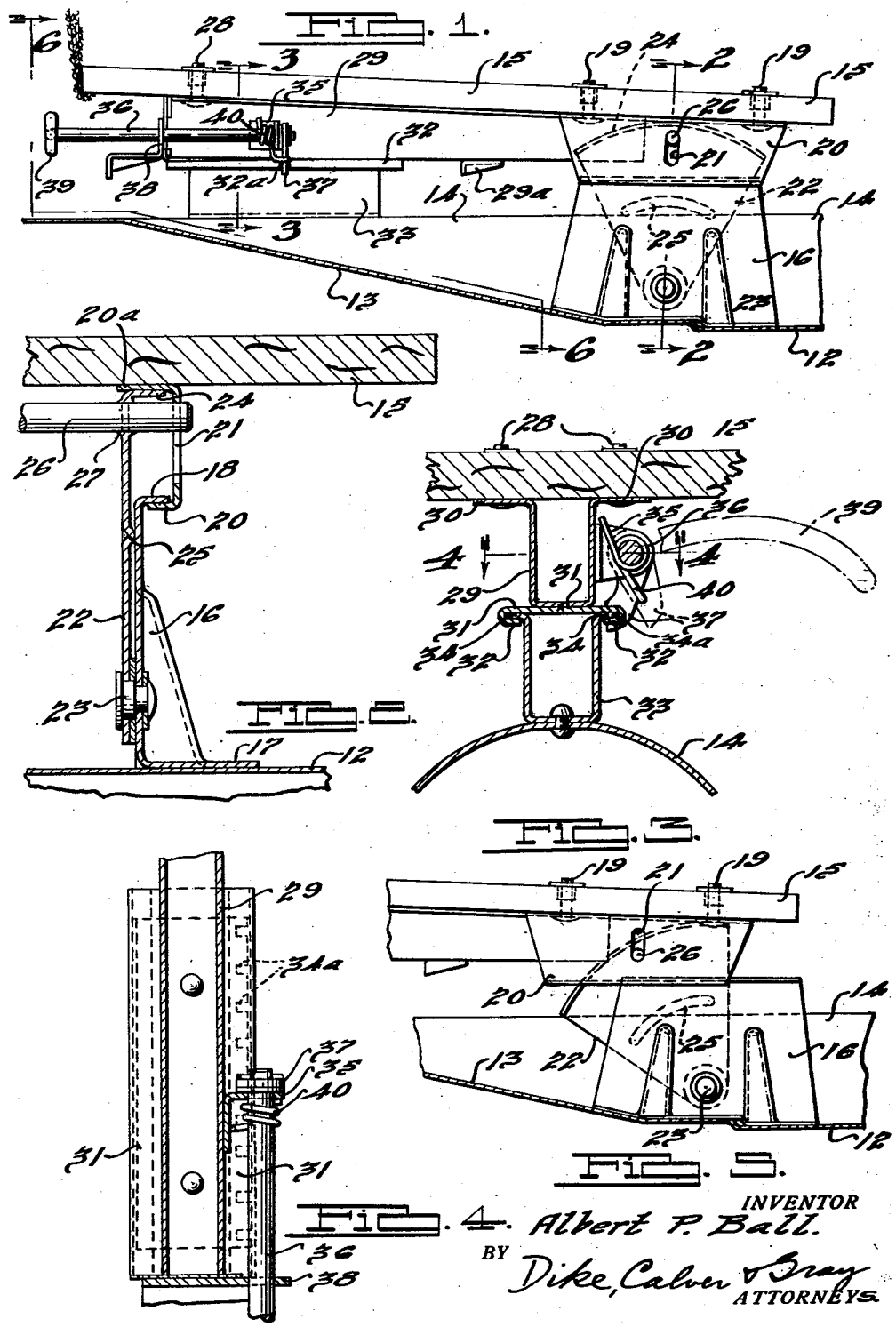
INVENTOR
Albert P. Ball.
BY Dike, Calver & Gray
ATTORNEYS.

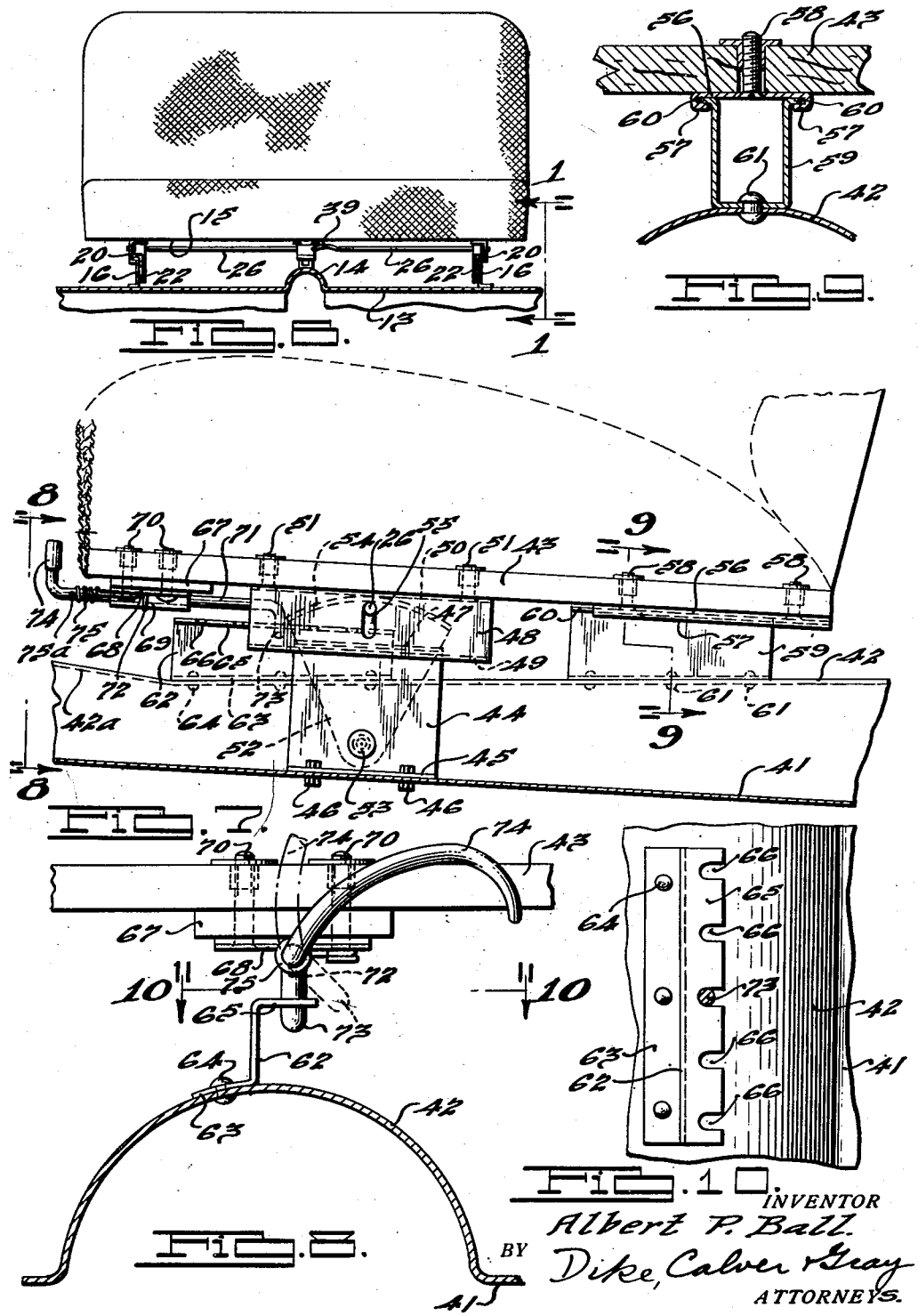

Patented June 16, 1942

2,286,946

UNITED STATES PATENT OFFICE 2,286,946

ADJUSTABLE SEAT

Albert P. Ball, Detroit, Mich., assignor to Briggs Manufacturing Company, Detroit, Mich., a corporation of Michigan Application July 13, 1938, Serial No. 219,011

5 Claims. (Cl. 155—14)

This invention relates to adjustable seats adapted particularly, although not exclusively, for use in vehicles, such as automobiles. An adjustable seat constructed in accordance with the present invention is especially applicable for use as the driver's seat in an automobile and enables the driver to readily and easily adjust the seat to the desired position with respect to the steering wheel and foot pedals of the vehicle.

An object of the invention is to provide a seat for a vehicle or automobile body having a rolling support permitting adjustment of the seat longitudinally of the vehicle floor in improved and simplified manner.

Another object of the invention is to provide a seat particularly adapted for use as the driver's seat of an automobile, wherein there is provided improved supporting means for the seat constructed and arranged to permit easy and quick longitudinal adjustment of the seat in substantially a straight line path.

Another object of the invention is to provide an adjustable seat having a plurality of spaced points of support upon which the seat is freely mounted to permit effortless longitudinal adjustment of the seat by the occupant thereof.

A further object of the invention is to provide a seat capable of free and easy longitudinal adjustments through the medium of combined sliding and rolling connections, releasable locking means being provided within easy reach of the seat occupant for maintaining the seat in any of its longitudinally adjusted positions.

The above and other objects and advantages of the invention will appear from the following description and appended claims when considered in conjunction with the accompanying drawings forming a part of this specification wherein like reference characters designate similar parts in the several views.

In said drawings:

Fig. 1 is a side elevational view, partly in section, of a seat structure embodying one form of the present invention.

Fig. 2 is an enlarged upright section taken substantially along the line 2—2 of Fig. 1, looking in the direction of the arrows.

Fig. 3 is an enlarged vertical section taken substantially along the line 3—3 of Fig. 1, looking in the direction of the arrows.

Fig. 4 is a fragmentary horizontal section taken substantially along the line 4—4 of Fig. 3, looking in the direction of the arrows.

Fig. 5 is a fragmentary side elevation of the rear end of the seat structure shown in Fig. 1, with the seat in a forwardly adjusted position.

Fig. 6 is a front elevational view, partly in section, taken substantially along the line 6—6 of Fig. 1, looking in the direction of the arrows.

Fig. 7 is a view similar to Fig. 1 showing a modified form of seat structure embodying the present invention.

Fig. 8 is an enlarged fragmentary front elevational view, partly in section, taken substantially along the line 8—8 of Fig. 7, looking in the direction of the arrows.

Fig. 9 is an enlarged vertical sectional view taken substantially along the line 9—9 of Fig. 7, looking in the direction of the arrows; and Fig. 10 is an enlarged horizontal plan view, partly in section, taken substantially along the line 10—10 of Fig. 8, looking in the direction of the arrows.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation, and it is not intended to limit the invention claimed herein beyond the requirements of the prior art.

Referring now particularly to Figs. 1 to 6 inclusive, there is shown one form of the present invention in which the seat proper is supported at transversely spaced points adjacent the rear end thereof by rolling or rocking supporting members and adjacent its front end by a single sliding support.

As shown, the invention is applied to the floor 12 of a vehicle which has an upwardly and forwardly inclined floor portion 13 and a substantially centrally arranged housing or tunnel portion 14 above which the seat 15 is supported.

As see particularly in Figs. 1, 2 and 5, an upright bracket 16 having a bottom flange 17 and a top flange 18 is secured in any suitable manner to the floor 12. The seat 15 has secured to the underface thereof, as by means of bolts or the like 19, a substantially U-shaped member or channel 20 provided in the web portion thereof with a vertical slot or opening 21. The lower flange of the member 20 engages beneath or underlaps the top flange 18 of the upright bracket 16. It will be understood that there is a bracket 16 and a channel member 20 provided adjacent each end of the seat at the rear thereof, see particularly Fig. 6.

The rear portion of the seat of the present form of the invention is preferably supported adjacent each of its narrow sides or ends and in the region of the members 16 and 20 with an upright segmental supporting member 22. Each of the members 22 is pivotally connected adjacent its lower end at 23 to the bracket 16. The upper end of each member 22 has a preferably outwardly directed arcuate supporting surface or flange 24 which cooperates with and engages the underface of the top flange 20a of the member 20 so as to have rolling or rocking contact therewith. The member 22, on its outer face, is provided with an arcuate embossment 25 which engages the adjacent face of the bracket 16 to provide a bearing between the member 22 and the bracket 16 during the rocking or rolling movement of the segment 22 relative to the bracket on the occasion of the longitudinal adjustment of the seat.

As stated above there is a segment 22 and associated parts located adjacent each side or end of the seat beneath the rear portion thereof. These segments are interconnected by means of a transverse tie rod or equalizer bar 26 which extends through aligned holes in the segments 22, with the extremities of the rod projecting outwardly through the slots 21 formed in the members 20. As seen in Fig. 2, the rod 26 is preferably secured against relative movement with respect to the segment 22 in any suitable manner as by solder 27, although the parts 26 and 22 may be secured together by welding or by any other expedient. Thus, by fixing the laterally spaced members 22 together by means of the rod 26, the movements of both members always correspond during the longitudinal adjustment of the seat.

As clearly seen in Fig. 5, when the seat 15 is moved forwardly or to the left of that figure the segment 22 moves about its pivot 23 and provides, in effect, a rolling support for the seat. During such movement the equalizer bar 26 rides downwardly in the slot 21 to permit the tilting movement of the member 22 as the seat 15 is moved forwardly. Fig. 1 shows the seat in a neutral position from its forward and rearward limits of movement, whereas Fig. 5 shows the seat 15 at its maximum forward position.

In addition to supporting the seat of Figs. 1 to 6 inclusive, by means of the segments 22 and associated parts, the forward portion of the seat is preferably supported at a central point by means located above and attached to the tunnel portion 14 of the floor structure. As seen in Fig. 3, the underside of the seat 15 has secured thereto, by means of bolts or the like 28, a substantially U-shaped member or channel 29 provided with outwardly directed horizontal flanges 30 through which the heads of the bolts 28 pass to secure the flanges to the seat. This U-shaped member 29 carries a guide member 31 which is fixed thereto and which has inturned flanges 32. The flanges 32 slidingly engage the outturned flanges 34 of a U-shaped member or channel 33 which is mounted upon and directly secured to the tunnel 14. Thus it will be seen that the members 29 and 31 may be slid, as a unit, relatively to the members 33, 34 in a longitudinal direction when the seat is moved over the support. The member 29 carries on its side face an angle bracket 35 which provides a bearing for the inner end of a latch operating rod 36 carrying a latch member 37. The intermediate portion of the rod 36 finds a bearing in a suitable depending bracket or member 38 attached to the channel 29 carried by the seat.

Referring particularly to Figs. 1, 3 and 4, it will be seen that the flange 32 at the right of these figures is provided with a notch 32a through which the latch 37 is movable. The cooperating nested flange 34 of the fixed support 33 is provided with a series of spaced notches 34a so that when the notch 32a is aligned or in register with one of the notches 34a the latch member 37 can enter them and thus maintain the parts against relative longitudinal movement. In other words, the support 33 is fixed to the tunnel 14 against movement relative thereto and cooperates with the parts 29, 31 which are movable with the seat 15. As seen in Fig. 1, the forward end of the latch actuating rod 36 is provided with a finger piece or handle 39 located below the front edge of the seat and slightly in advance thereof to be within easy reach of the seat occupant. A coil spring 40 surrounds the end of the rod 36 adjacent the latch 37 and has one of its ends in engagement with the bracket 35 and its other end engaging the outer edge of the latch so as to maintain the latch normally in latching position, as shown particularly in Figs. 1 and 3.

As seen in Fig. 1, the member 29 carries a stop 29a which is adapted to engage a portion 33a of the fixed support 33 to limit the forward movement of seat 15.

It will be seen that the seat structure of the present form of the invention which has been described above is supported at two laterally spaced points adjacent the rear thereof by the rolling segmental supports 22 and at a single point substantially midway of the ends of the seat and adjacent the front edge thereof by the coperating members 29, 31 and 33. Thus rigid supporting means for the seat are provided which prevent any tilting or twisting movement thereof during the normal longitudinal adjustment of the seat in a straight line path. By providing the member 20, 20a, it will be understood that in view of the engagement of the lower flange of the member 20 with the bracket top flange 18 it is impossible for the occupant of the seat to elevate the latter with respect to the floor surface during the operation of adjusting the seat in a longitudinal direction.

Referring now particularly to Figs. 7 to 10 inclusive of the drawings, there is shown a somewhat modified form of seat structure embodying the present invention. The structure therein shown is generally similar to that of the preceding form of the invention and is particularly well adapted for use with vehicle floors of somewhat different shape and confirmation from that of the preceding views. In the present instance, as shown, the floor 41 extends generally in a common inclined plane rising slightly toward the front of the vehicle and is provided with a tunnel or housing portion 42 which, as shown, tapers somewhat downwardly toward the front of the vehicle to a point adjacent the front end of the seat 43 and then rises upwardly as seen at 42a at the left of Fig. 7. The seat or seat bottom or base 43 and the remainder of the seat proper, as shown, are supported at three points, the front end of the seat being supported preferably by a pair of laterally spaced rockable or roller-like segmental supports or members and the rear end of the seat by a substantially centrally disposed single supporting structure so as to properly support and balance the seat.

Attached to the floor 41 adjacent each end of the seat 43 is a pair of transversely spaced upright brackets 44. Each bracket has a bottom flange 45 which, as shown, is secured to the floor by means of bolts or the like 46 and a top flange 47 which extends outwardly in the same general direction as the bottom flange 45. Secured to the underface of the seat 43 in the region of the bracket 44 is a substantially channel-shaped member 48 having a bottom flange 49 and a top flange 50, the top flange being secured to the seat 43 by bolts or cap screws 51. The flange 49 underlaps the flange 47 and these flanges cooperate to prevent the seat 43 from being elevated above the floor during the adjustment thereof. The seat 43, adjacent each of its ends, rests upon one of the segmental supports previously referred to. Each of these supports comprises a segment 52 pivotally connected at 53 at a point remote from the top of the support, to the bracket 44. Each support 52 has an outturned arcuate bearing portion, flange or supporting surface 54 which, when the parts are assembled, is interposed between the flanges 49 and 50 of member 48, with the flange 50 resting freely on the arcuate support 54. As in the case of the preceding form of the invention, the web portion of each member 52 is provided with a hole or opening through which the end portion of the transverse equalizer or stringer bar 26 extends and is soldered or welded thereto. The free ends of the equalizer bar project through vertically arranged slots 55, one thereof being provided in each of the U-shaped members or channels 48. In these respects, the members 26, 48 and 52, etc., correspond to the parts 26, 20 and 22 of the preceding form. The equalizer bar 26 ties the two segmental supports 52 together so that they move in unison when the seat is adjusted longitudinally.

The rear support for the seat, in the present instance, Figs. 7 and 9, comprises a guide member or plate 56 having inturned oppositely disposed flanges 57 on its bottom side and is secured to the underface of the seat in any suitable manner, as by means of bolts or screws 58. The tunnel 42 in the region of the member 56 has fixed thereto an upright U-shaped member or channel 59 having at its upper side edges outturned flanges 60 which engage slots formed between the body of the plate or member 56 and the inturned flanges 57 thereof. The member 59 may be attached to the tunnel 42 by means of rivets or the like 61 so as to hold it firmly in place upon the tunnel. The flanges 60 and 57 of the two cooperating members engage one another with a sliding fit so that the seat 43 with its attached plate and flanges 56, 57 can be slid longitudinally relative to the support 59.

In accordance with the present form of the invention a substantially Z-shaped supporting bracket 62 has its lower flange 63 secured to the tunnel 42 at a point preferably beneath the front end of the seat, by means of rivets 64. The top flange 65 of the bracket extends in a direction opposite to that of the flange 63. The top flange 65 is provided with a series of longitudinally spaced edge notches 66 (Fig. 10) for the purpose of receiving the end of a latch member now to be described.

The latch mechanism is supported beneath the seat base 43 by means of a spacing block 67, and a looped plate 68 having a socket or U-shaped portion 69 formed therein. The plate or block 67 and the member 68 are secured in place upon the underface of the seat by means of bolts or screws 70. The operating rod or bar 71 of the latch mechanism extends longitudinally through the socket portion 69 and is maintained against axial movement by means of a pin 72 which engages a transverse slot formed in the member 69 intermediate its ends. The inner end of the rod 71 is turned down or at a substantial right angle to the body of the rod to provide a latch end or portion 73 capable of being engaged with any one of the notches 66. This latch end 73 is normally held in its downturned notch engaging position by means of a spring 75 which surrounds the rod 71 and has one end fixed to the member 68. As shown, this end is looped around one of the bolts 70 to hold it in place, it being understood that the other end of the spring may be threaded through a hole in the rod 71, as shown at 75a, see Fig. 7. The outer or forward end of the rod 71 is turned at an angle and is provided with a curved finger piece or handle 74 located in advance of the lower portion of the seat cushion within easy reach of the seat occupant.

As in the case of the preceding form of the invention, the operation of the present form is substantially identical with that previously described. When it is desired to shift the seat forwardly, the handle 74 is grasped and the latch 73 removed from engagement with one of the notches 66. The occupant now pulls the seat 43 forwardly during which movement the segmental supports 52 provide, in effect, a rolling action with the flanges 50 riding freely over and along the arcuate supporting surfaces 54 of the segmental supports. The rear portion of the seat, during this movement, is supported and guided by the cooperating members 56 and 59, the former being carried by the seat and the latter being rigidly supported by the tunnel portion 42 of the floor surface. In its forward position, the seat and the pivoted segmental supports or rockers 52 will assume positions similar to those of the corresponding parts shown in Fig. 5, the equalizer bar 26 travelling with the segmental supports 52 and riding downwardly in the slots 55 formed in the members 48.

From the foregoing it will be seen that I have provided an adjustable seat structure for a vehicle body including a longitudinally movable seat and a three-point support therefor, in which the three-point support comprises a centrally located sliding connection between one end of the seat and a fixed portion of the vehicle body and a pair of upright swinging members having arcuate supporting surfaces which provide rolling supports for the opposite end of the seat.

I claim:

1. An adjustable seat for a vehicle body comprising spaced brackets fixed to the vehicle body floor longitudinally thereof and having flanged upper portions, downwardly disposed brackets fixed to the seat and having flanged lower portions adapted to cooperate with the first named flanges to induce the seat to move longitudinally relative to the vehicle body, segmental supporting members pivotally mounted on the first named brackets and having convex portions adapted to engage and support the seat, and an equalizer bar between the segmental supporting members.

2. An adjustable seat for a vehicle body comprising spaced brackets fixed to the vehicle body floor longitudinally thereof and having flanged upper portions, downwardly disposed brackets having vertically extending apertures therein fixed to the seat and having flanged lower portions adapted to cooperate with the first named flanges to induce the seat to move longitudinally relative to the vehicle body, segmental supporting members pivotally mounted on the first named brackets and having convex portions adapted to engage and support the seat, an equalizer bar carried by the segmental supporting members and projecting through the vertically extending apertures in said downwardly disposed brackets, and means interposed between said brackets and spaced longitudinally therefrom to support another portion of the seat.

3. An adjustable seat structure for a vehicle body having a floor surface comprising an upright bracket having an outwardly flanged portion secured to said floor surface, an upright segmental support pivoted adjacent its lower end to said upright bracket and having a convexly curved supporting surface at its upper end, a seat mounted freely upon said supporting surface, the latter providing a rolling support for the seat upon the longitudinal movement of the seat, and means including a channel shaped member having one flange interposed between the seat and said upright segmental member and having its other flange engaged beneath said outwardly flanged portion of said bracket for permitting sliding movement of the seat while preventing vertical displacement thereof.

4. In a seat structure for a vehicle body having a floor surface, the combination of a seat movable forwardly and rearwardly, upright brackets extending above said floor surface, a pair of transversely spaced upright members pivoted at their lower ends to said brackets and having upper convexly curved surfaces providing rolling supports for the seat, said members and said pivotal connections therefor maintaining said seat in substantially the same angle of inclination during its forward and rearward movements and a shaft connecting said members together for swinging movement in unison, said seat having depending portions provided with vertical slots for slidingly receiving the shaft.

5. An adjustable seat structure for use with a vehicle body in which said body includes a floor having a substantially centrally disposed longitudinally extending raised portion, said seat structure comprising transversely spaced brackets fixed to the floor and having flanged upper portions, cooperating transversely spaced brackets fixed to the seat and having flanged lower portions cooperating with the first named flanged portions to prevent the seat from raising relative to the floor and to enable it to move longitudinally relative thereto, paired supporting members pivotally mounted on the first named brackets and having convex portions engaging and supporting the seat for longitudinal movement in the vehicle body, and cooperating slide means interconnecting a portion of the seat and the raised portion of the floor.

ALBERT P. BALL.